No. 872,502. PATENTED DEC. 3, 1907.
E. F. DOOLITTLE.
POULTRY ROOST.
APPLICATION FILED MAR. 11, 1907.
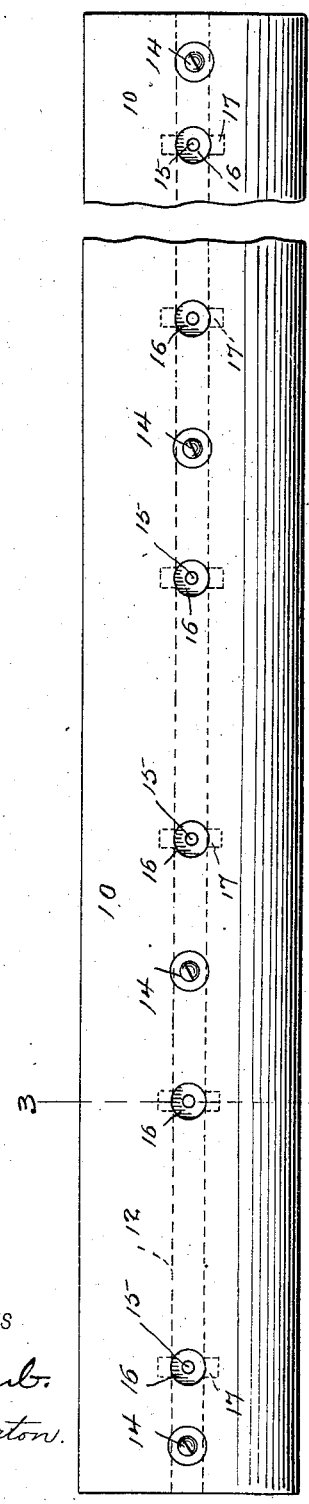
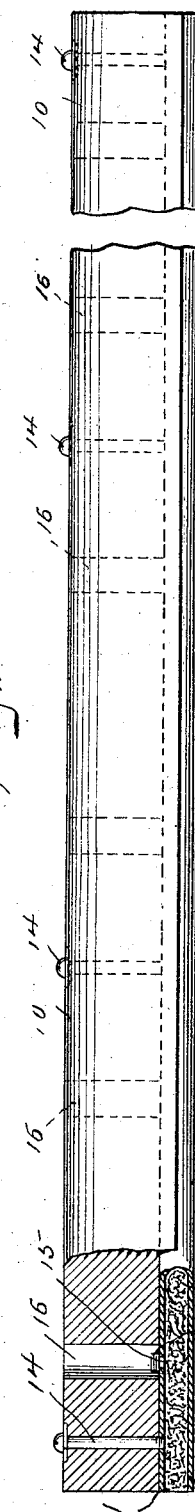
WITNESSES
H. A. Lamb.
S. W. Atherton.
INVENTOR
Elford F. Doolittle
BY
A. M. Wooster
ATTORNEY
THE NORRIS PETERS CO., WASHINGTON, D. C.

UNITED STATES PATENT OFFICE.

ELFORD F. DOOLITTLE, OF TORRINGTON, CONNECTICUT.

POULTRY-ROOST.

No. 872,502.

Specification of Letters Patent.

Patented Dec. 3, 1907.

Application filed March 11, 1907. Serial No. 361,695.

*To all whom it may concern:*

Be it known that I, ELFORD F. DOOLITTLE, a citizen of the United States, residing at Torrington, county of Litchfield, State of Connecticut, have invented a new and useful Poultry-Roost, of which the following is a specification.

This invention has for its object to provide a simple and inexpensive perch or roost for birds and poultry which shall be provided with means for destroying parasitic insects, as lice, upon the birds or poultry using the roost, to provide in brief an antiseptic vermin-proof and vermin-destroying roost, so that birds and poultry infected with parasitic vermin will be relieved from the infection by use of the roost and will be kept free therefrom.

With this object in view I have devised the novel perch or roost which I will now describe, referring to the accompanying drawing forming a part of this specification and using reference characters to indicate the several parts:

Figure 1 is a plan view of my novel perch or roost; Fig. 2 a side elevation partly in vertical section; and Fig. 3 is a transverse section on the line 3—3 in Fig. 1.

10 denotes the body of the roost, which is a strip of wood having the form of a convex curve upon its upper side. In practice, I preferably make the strips semi-cylindrical, although this is not an essential feature of the invention. In the lower side of the body is a groove 11 in which is secured a metal tube 12 containing a wick 13 which is thoroughly impregnated with an antiseptic disinfecting, vermin-destroying chemical, as sulfo-naphthol. The tube is detachably secured in place in any convenient manner, as by screws 14 passing down through the body and engaging the tube. The upper side of the tube is provided with holes 15 which register with larger vertical openings 16 in the body. This is in order to permit fumes from the wick to escape therefrom and pass up through the openings in the body and impregnate the air over the roost or perch, so that birds or poultry using the roost will be thoroughly disinfected by the fumes and remain so. At the lower ends of openings 16 I preferably provide openings 17 in the body on opposite sides of the tube and communicating with openings 16, to permit dust that may settle in openings 16 to drop through and past the tube and so not clog the openings. At intervals which are well understood in practice—as, for example, every three or four months—the tube may be removed from the body by loosening the screws and the wick removed therefrom and again impregnated with the antiseptic vermin-destroying chemical, it being, of course, obvious that occasional renewing of the chemical is necessary, although I have found in practice that it is not necessary to do so oftener than three or four times a year. Having re-charged the wick and threaded it in the tube, the latter is again placed in the groove and secured in position by means of the screws.

Having thus described my invention, I claim:

1. A device of the character described comprising a body of wood having openings through it, a tube secured to the body and having openings registering with the openings in the body and a wick in the tube adapted to be saturated with an antiseptic chemical.

2. A device of the character described comprising a body of wood curved upon its upper side and having vertical openings, a tube secured to the body on the underside and having openings registering with the openings in the body and a wick in the tube, substantially as described, for the purpose specified.

3. A device of the character described comprising a body of wood curved upon its upper side having vertical openings and provided with a groove in its underside, and openings in the under side communicating with the vertical openings, a tube secured in the groove and having openings registering with the vertical openings in the body and a wick in the tube, substantially as described, for the purpose specified.

4. A device of the character described comprising a body of wood semi-cylindrical upon its upper side and having a groove in its underside and vertical openings communicating with the groove, a tube having openings registering with the openings in the body, a wick in the tube for the purpose specified and screws passing through the body and engaging the tube.

5. A device of the character described comprising a body of wood curved upon its upper side having a groove in its under side and provided with vertical openings communicating with the groove, and openings in the under side communicating with the vertical openings, for the purpose set forth, a tube having openings registering with the vertical openings in the body and secured to the body and a wick in the tube, substantially as described, for the purpose specified.

In testimony whereof I affix my signature, in presence of two witnesses.

ELFORD F. DOOLITTLE.

Witnesses:
WALTER HOLCOMB,
GEORGE E. COOK.